United States Patent [19]

Proulx

[11] 4,277,207
[45] Jul. 7, 1981

[54] HELICAL BROACHING TOOL FOR CURVED SURFACES

[75] Inventor: Sylvester E. Proulx, Windsor, Canada

[73] Assignee: J.P. Tool Ltd., Ontario, Canada

[21] Appl. No.: 40,377

[22] Filed: May 18, 1979

Related U.S. Application Data

[63] Continuation-in-part of Ser. No. 867,292, Jan. 5, 1978.

[51] Int. Cl.³ ............................................. B26D 1/12
[52] U.S. Cl. ...................................................... 407/15
[58] Field of Search ....................... 407/13, 15, 17, 60, 407/62

[56] References Cited

U.S. PATENT DOCUMENTS

| Re. 23,239 | 11/1974 | Dupuis | 407/17 |
|---|---|---|---|
| 1,272,841 | 7/1918 | Oakley et al. | 407/15 |
| 1,577,952 | 3/1926 | Carnegie | 407/62 |
| 2,258,163 | 10/1941 | Peters et al. | 407/15 |
| 2,585,166 | 2/1952 | Phaneuf | 407/15 |
| 2,645,003 | 7/1953 | Thompson | 407/62 |
| 2,680,898 | 6/1954 | Diosi, Sr. | 407/60 |
| 2,730,793 | 1/1956 | Anthony et al. | 407/17 |
| 2,770,028 | 11/1956 | Bonnaffe | 407/15 |
| 2,906,004 | 9/1959 | McVey | 407/15 |
| 3,103,736 | 9/1963 | Ortman, Jr. | 407/62 |
| 3,262,183 | 7/1966 | Raehrs | 407/17 |
| 3,317,984 | 5/1967 | Jacobson | 407/13 |
| 3,371,397 | 3/1968 | Coleshill et al. | 407/62 |
| 3,464,098 | 9/1969 | Moore et al. | 407/40 |
| 3,540,103 | 11/1970 | Saari | 407/62 |
| 3,656,220 | 4/1972 | Dupuis | 407/17 |
| 3,670,380 | 6/1972 | Moore et al. | 407/42 |
| 3,707,748 | 1/1973 | Price et al. | 407/17 |
| 3,946,472 | 3/1976 | Proulx et al. | 407/17 |

*Primary Examiner*—Harrison L. Hinson
*Attorney, Agent, or Firm*—Neuman, Williams, Anderson & Olson

[57] ABSTRACT

A broaching tool is described having an elongated tool body with an arcuate face of preferably half-round configuration. A plurality of recesses are formed on the arcuate face, each having a bottom face inclined inwardly and rearwardly within 1-15° of coincidence with the longitudinal axis of the body and an abutment wall extending upwardly from a rearward portion of the bottom face. These recesses are arranged in helical paths of preferably increasing diameter in a rearward direction to form a series of spaced helical rows. Each recess contains a rotatably indexable cylindrical cutter disc. This configuration of broach has the advantages of providing excellent chip clearance between the cutters and also providing a uniform load on the tool during broaching.

14 Claims, 5 Drawing Figures

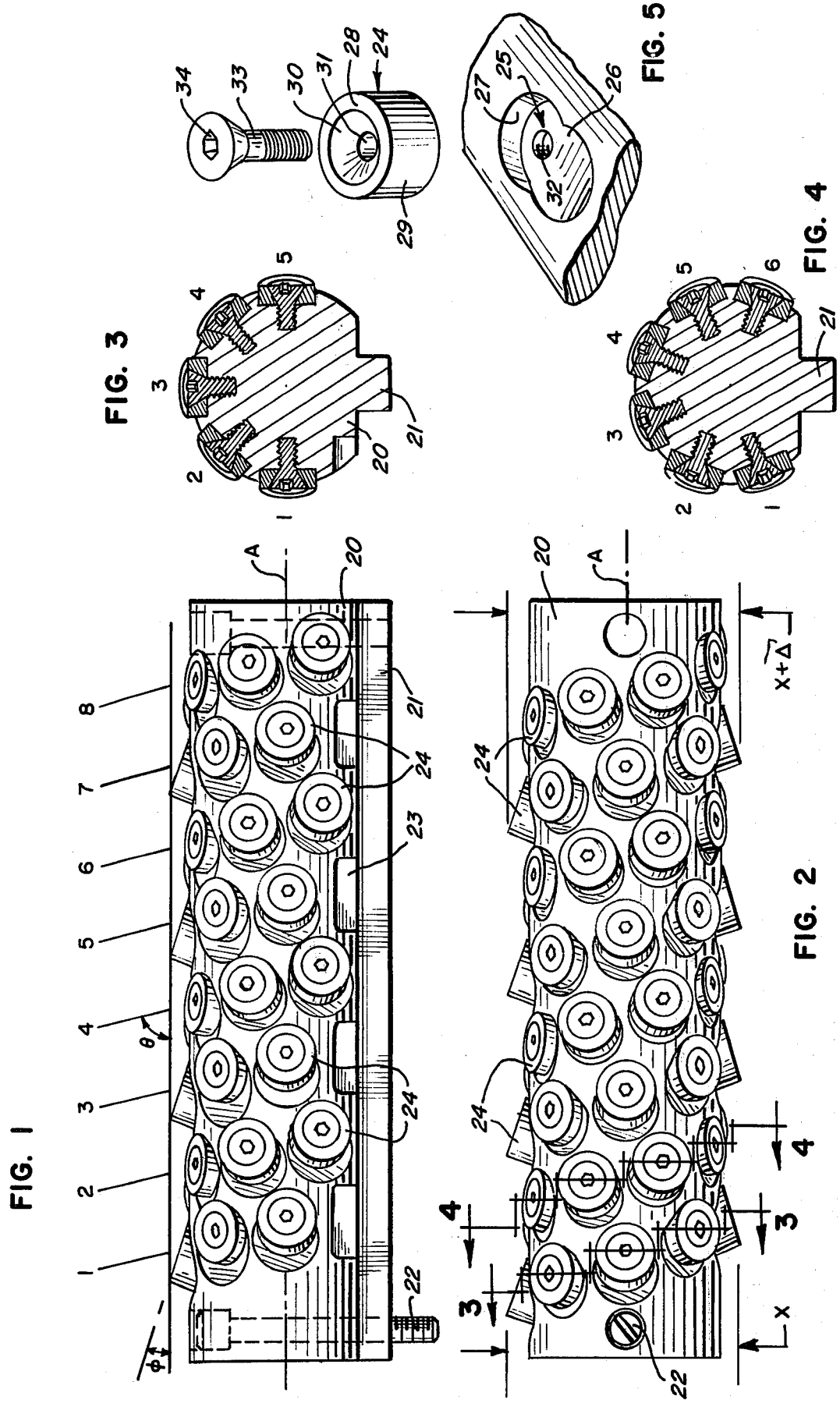

HELICAL BROACHING TOOL FOR CURVED SURFACES

BACKGROUND OF THE INVENTION

1. Field of the Invention

This invention relates to a novel broaching tool of the type typically used to produce a round hole or a semicircular hole, and is a continuation-in-part of application Ser. No. 867,292, filed Jan. 5, 1978.

2. Description of the Prior Art

Broaching is a machining process whereby one or more cutters with a series of teeth are pushed or drawn entirely across a workpiece and is analogous to single-stroke filing. Broaching is typically carried out on manually-operated presses, on pull-screw machines or on hydraulically actuated broaching machines or presses. The broach has teeth which increase in height toward one end and is typically held in the screw socket of a broaching machine screw or ram by a taper cotter. Usually the first few teeth on the broach are low to permit the small end of the tool to pass through a hole in the workpiece, while the intermediate teeth remove most of the metal and the last few teeth finish the surface to size.

The typical broaching tool presently in use is in the form of an elongated body having a plurality of spaced annular ribs generally transverse to the longitudinal body of the axis. A series of titanium carbide teeth are brazed onto side walls of these ribs in a position perpendicular to the longitudinal body axis. Each of these teeth has a curved upper cutting edge. Of course, when these cutter teeth become worn, it becomes a very expensive proposition to remove the worn teeth and then braze new cutter teeth into position against the ribs. Also, because each cutting edge engages the workpiece at substantially 90°, it will be appreciated that immense stresses are placed on the tool and the cutter teeth, particularly when broaching metals.

In applicant's U.S. Pat. No. 3,946,472, issued Mar. 30, 1976, there is described a broaching tool in which cutter teeth in the shape of buttons or discs have been successfully used for the broaching of concave surfaces. This had the unique feature of being able to make use of the angular positioning of the discs so as to form a smoothly curving contoured surface. Although this represented a great improvement over the previous broaching tools, it did have some problems. Thus, for most broaching tools it was necessary to provide sufficient space between the rows of cutter discs so that chips formed would be dispersed easily and not become jammed between cutter discs thereby creating difficulties. Moreover, because the cutter discs were arranged in parallel rows, very heavy instantaneous loads were placed on the tool as the cutters in each row simultaneously came into engagement with the workpiece. This stress engagement can result in breakage of the broaching tool and/or damage to the workpiece.

It has also been found that there previously existed problems in broaching light weight alloy workpieces, such as the main crankshaft bearing supporting walls of cylinder blocks or cylinder heads and walls of cylinder blocks, and it is believed that these were caused by the very high instantaneous loads created by use of the usual broaching tools of the prior art, including that of U.S. Pat. No. 3,946,472, and especially the flexing of the support walls by the intermittent stressing as the rows of cutters intermittently engaged the workpiece surface.

It is, therefore, the object of the present invention to provide an improved configuration of broaching tool for the broaching of concave surfaces in which the chip dispersal is simplified and the tool is provided with a substantially uniform loading during operation.

SUMMARY OF THE INVENTION

In accordance with the present invention there is provided a novel cutting tool comprising an elongated tool body having an arcuate face of at least 45°. A plurality of recesses are formed in this arcuate face, each recess having a bottom face inclined inwardly and rearwardly within 1°–15° of coincidence with the longitudinal axis of the body and an arcuate abutment wall extending upwardly from a rearward portion of the bottom face. The recesses are arranged in helical or generally circumferentially and axially advancing paths about the tool body arcuate face to form a series of spaced helical rows. The recesses of each row are staggered circumferentially with respect to the recesses of the next adjacent row whereby paths of successive recesses partially overlap. Cylindrical cutting discs are mounted in the recesses, each disc having an end face providing a cutting edge disposed about the periphery of the end face and being rotatably indexable about its longitudinal axis to bring successive portions into cutting position.

The arcuate face forms an arc of at least 45° and usually at least 90°. For a typical half-round broach the arc will be in excess of 180° and it may even form a full cylindrical broach. The helical path normally defines an angle of about 5° to 95° with respect to the longitudinal axis of the body and a typical tool has a helical angle in the order of about 15° to 45°.

The helical paths can be of equal diameter along the length of the broach, but are preferably of increasing diameter in a rearward direction so as to produce a progressively larger hole as the broach is moved through the workpiece or the workpiece over the broach. Thus, each helical path may be slightly larger, e.g., about 0.004 inch, than the preceding path, or two or more adjacent helical paths may be of the same diameter followed by two or more paths of increased equal diameter. It is also sometimes desirable to have the last cutting disc of one row at the same radial distance from the longitudinal axis of the tool body as the first cutting insert of the next following row. The cutter discs are preferably arranged so that at least two of said cutter discs are intersected by all cutting planes normal to the longitudinal axis of the tool body between the first and last cutter disc means.

The angle $\phi$ of the recess bottoms and the cutter discs resting thereon with respect to the longitudinal axis A of the body can be varied within the range of about 1°–15°. By setting the series of small round cutting discs at a small angle with respect to the longitudinal axis of the body, the cutting edges of the cutter discs thereby form small arcs of a much larger circle than the diameter of the discs themselves. This, combined with the overlapping of the successive cutters due to the staggering arrangement of cutters in successive rows, results in the depth of grooves formed in the finished surface being very small. Normally, the discs are arranged to broach a hole having a radius at least three times the radius of the individual cutter discs.

Certain preferred embodiments of the present invention will now be illustrated by the attached drawings in which:

FIG. 1 is a side elevation of one embodiment of the novel broaching tool;

FIG. 2 is a top plan view of the broaching tool shown in FIG. 1;

FIG. 3 is a cross section through row 1 of the tool;

FIG. 4 is a cross section through row 2 of the tool; and

FIG. 5 is an exploded detailed view of a cutting disc and socket.

The particular broach illustrated in the drawings is known as a half-round broach. It has an elongated tool holder body portion 20 having a bottom spline 21 extending along the length thereof for retaining the tool in a tool holder. The tool is held rigidly in place in the holder by the mounting screws 22.

At the lower edges of the cylindrical surface are provided a series of pockets 23 and these serve as interlocks with adjacent flat broaches which may be used in conjunction with the half-round broach.

A series of cutter discs 24 are mounted in sockets 25 in the cylindrical surface. Each of these sockets has a flat bottom face 26 which is inclined at a small angle $\phi$ of typically about 11° to the longitudinal axis A of the body portion 20 and the socket also has a semi-circular abutment wall 27 which is perpendicular to the bottom face 26. Extending into the body portion 20 through face 26 is a tapped hole 32.

Each cutting disc 24 has a cylindrical wall 29 and end faces 28. A hole 31 is formed axially through the insert with a conical countersink 30. The cutting disc is typically made from tungsten carbide. It is held in position by means of a threaded screw 33 which has a conical head portion which mates with the countersink of the cutting disc and the head of the screw includes a socket 34 for receiving a wrench. When the cutting disc has been placed in position in the socket 25 and the screw tightened, the insert is pressed firmly against the abutment wall 27. Thus, when the broach is in operation the forces on the cutting inserts are fully carried by the abutment walls 27 rather than by the screws themselves.

With this arrangement, it will be seen that only about one-quarter of the cutting edge of the cutter discs is in use at one time. This means that as the portion in use becomes dulled, the screws 33 can be loosened and the cutter discs can then be rotated sufficiently to present fresh cutting edge portions, after which the screws are again tightened. The result is that as many as four cutting edge portions may be available on one face of a cutter disc. Furthermore, it is possible to make the discs reversible so that another four cutting edge portions may be available on the reverse face. In this way as many as eight fresh cutting edge portions may be obtainable from a single cutting disc.

A typical cutter disc may have a diameter in the range of about ⅜ inch to about 1 inch and these are used in cutting holes having a diameter of at least 1 inch.

In FIG. 1 eight helical rows of cutting discs are shown and these are indicated as rows one to eight. The helical paths normally define an angle $\theta$ of about 5° to 95° with respect to the longitudinal axis A of the body. FIG. 3 shows the positioning of the cutter discs for what are designated as rows 1, 3, 5 and 7 in FIG. 1. Each of the odd-numbered rows has five (5) cutting discs as shown in FIG. 3. FIG. 4 is a cross-section showing the position of the cutter discs for the rows designated as 2, 4, 6 and 8 in FIG. 1. Each of the even-numbered rows has six (6) cutting discs as shown in FIG. 4. Particularly from FIGS. 3 and 4 it becomes evident that the successive rows of cutting inserts are positioned in a circumferentially staggered manner. Thus, the axes of the cutting inserts of row 2 are positioned midway between the axes of the inserts of row 1 while the inserts of row 3 are in alignment with the inserts of row 1. The diameter typically is increased by an amount of about 0.01 cm. from one row to the next following row. However, it is also possible to have two or more adjacent rows of the same diameter, followed by two or more rows of increased equal diameter. It is also sometimes desirable to have the last cutting insert of one row at the same elevation as the first cutting insert of the next following row.

One of the advantages of this helical configuration is that specific chip gaps are not necessary since the spacing between cutting discs in the helical configuration is increased thereby permitting easier flow of chips between cutters. The second and most important advantage of the helical configuration is that during operation some of the discs will always be under load. This overcomes any tendency of excessive impact as successive rows of cutting discs come into engagement with the workpiece. This feature will be evident from FIGS. 1 and 2 in that each cutting disc of each row comes into engagement with the workpiece successively and during engagement with the last cutting disc of one row, the workpiece is already coming into engagement with the first cutting disc of the next row. This greatly decreases the tendency of damage to the broach as well as possible breakage of the workpiece being broached from impact.

While the above preferred embodiment illustrates a screw connection for mounting the cutting inserts in the sockets, it will be readily apparent to those skilled in the art that many other kinds of mounting means are possible. Thus, wedging pins, etc. can be used.

It will also be apparent to those skilled in the art that although a half-round broach is illustrated, similar types of broaches forming arcs of less than a semi-circle or as much as a full circle are within the scope of the present invention.

The advantages of the present invention over the prior art are illustrated by the following examples.

EXAMPLE 1

A series of tests were first conducted to illustrate the differences in the cylindrical disc broaching tool of U.S. Pat. No. 3,946,472 with the traditional triangular and square cutter inserts of the prior art.

The tests were carried out on a vertical broaching machine with a tensile shear test fixture. All tests were carried out at 25 SFM on flat surfaces with a constant depth of cut of 0.005 inch. The following loadings on the cutter inserts were recorded:

| Type of Cutter | Width of Cut | Load Per Cutter |
| --- | --- | --- |
| 0.750 I.C. Square | 0.700" | 680 lbs. |
| 0.625 I.C. Triangle | 0.900" | 835 lbs. |
| 0.500 I.C. Round | 0.340" | 265 lbs. |

In order to compare the above results, they were all adjusted to a width of cut of 0.100 inch with the following results:

| Type of Cutter | Cutter Load Per 0.100" of Cut |
| --- | --- |
| 0.750 I.C. Square | 97 lbs/0.100" of cut |
| 0.625 I.C. Triangle | 93 lbs/0.100" of cut |
| 0.500 I.C. Round | 78 lbs/0.100" of cut |

From this it will be seen that the round cutters showed a decreased load per 0.100" of cut of approximately 20% compared with the load on a triangular cutter.

EXAMPLE 2

Further tests were conducted in order to compare different arrangements of the round cutter discs in half-round broaches. For these tests broach configurations were used as shown in the drawings of U.S. Pat. No. 3,946,472 and as shown in the drawings of this application. A horizontal broaching machine was used with strain gauges connected to the workpieces.

Both broaches utilized 0.500 I.C. round cutter inserts mounted in recesses with bottom faces at an angle of 11° to the longitudinal axis of the tool body. Both broaches contained rows of cutter disc inserts with 6 cutters per row. The broach according to U.S. Pat. No. 3,946,472 had the rows of cutter inserts mounted perpendicular to the longitudinal axis of the tool body while the helical broach of this invention had the rows of cutter inserts mounted at an angle of 20° to the longitudinal axis of the tool body.

The broaching tests were conducted to broach a half-round sector at the top of a bulkhead in a case iron workpiece. The broaching containing perpendicular rows of round cutter inserts (U.S. Pat. No. 3,946,472) showed a loading per cutter disc insert in the range of 284 to 335 lbs., with a complete load on the bulkhead ranging from 1956 to over 4070 lbs.

The recorded loads for the helical broach of this invention were 274 to 305 lbs per cutter disc insert and a complete load on the bulkhead ranging from 1920 to 2120 lbs.

Thus, while the loadings per insert between the two broaching tools was generally similar, but slightly less using the embodiment of the present invention, the variation in total load on the bulkhead was dramatically different between the two broaching tools. The helical tool showed a load variation of only 200 lbs on the bulkhead while the broach of U.S. Pat. No. 3,936,472 showed a load variation on the bulkhead of 2114 lbs. In other words, the load variation on the bulkhead using the helical broach of this invention is less than ±5% of that found using the broaching tool of the above U.S. Patent. Moreover, with an average bulkhead load of 3013 lbs for the embodiment shown in U.S. Pat. No. 3,946,472, the variations in total bulkhead loading were ±35% as contrasted to variations in total bulkhead loading of ±9.9% using the embodiment of the present invention at average bulkhead loads of 2020 lbs.

Accordingly, the broach of the present invention produces more uniform stresses on the workpiece and reduces the flexing and the liability of stress cracking of the workpiece associated with such flexing, especially in cast iron workpieces, in marked contrast to the widely variant loads and associated flexing on the workpiece using the broach form of U.S. Pat. No. 3,946,472.

What is claimed is:

1. A broaching tool comprising an elongated tool body having an arcuate face of at least 45°, a plurality of recesses formed in said arcuate face, each said recess having a flat bottom face inclined inwardly and rearwardly within 1°–15° of coincidence with the longitudinal axis of the body and an arcuate abutment wall perpendicular to and rearwardly surrounding said flat bottom face, said recesses being arranged in a helical path of generally increasing diameter in a rearward direction about said tool body arcuate face from the front end of said body to the rear end thereof to form a series of spaced helical rows with the recesses of each row being staggered circumferentially with respect to the recesses of the next adjacent row whereby the paths of successive recesses partially overlap, cylindrical cutter discs mounted in said recesses whereby the plane of said cutter discs lies parallel to the flat bottom face of said recesses, each disc having an end face providing a cutting edge disposed about the periphery of the end face and being rotatably indexable about its longitudinal axis to bring successive cutting portions into cutting position and said helical paths arranged such that the spacing between adjacent recesses within said helical paths is less than the spacing between adjacent helical paths.

2. A broaching tool according to claim 1 wherein the helical path defines an angle of about 5° to 95° with respect to the longitudinal axis of the tool body.

3. A broaching tool according to claim 2 wherein the arcuate face containing the cutter discs forms an arc of at least 90°.

4. A broaching tool according to claim 2 wherein the arcuate face containing the cutter discs forms an arc of at least 180°.

5. A broaching tool according to claim 2 wherein the arcuate face has an increasing diameter in the rearward direction.

6. A broaching tool according to claim 1 wherein the helical path defines an angle of about 15° to 45° with respect to the longitudinal axis of the tool body.

7. A broaching tool according to claim 6 wherein two or more adjacent rows of recesses are at the same diameter or elevation with respect to each other.

8. A broaching tool according to claim 6 wherein alternating pairs of adjacent rows of recesses are at the same diameter or elevation with respect to each adjacent row in the alternate pair.

9. A broaching tool according to claim 6 wherein the last recess of at least one helical row of recesses is at the same diameter or elevation as the first recess of an adjacent helical row of recesses.

10. A broaching tool comprising an elongated tool body having an arcuate face of at least 45°, a plurality of recesses formed in said arcuate face, each said recess having a flat bottom face inclined inwardly and rearwardly within 1°–15° of coincidence with the longitudinal axis of the body and an arcuate abutment wall perpendicular to and rearwardly surrounding said flat bottom face, said recesses being arranged in a helical path of generally increasing diameter in a rearward direction about said tool body arcuate face from the front end of said body to the rear end thereof to form a series of spaced helical rows with the recesses of each row being staggered circumferentially with respect to the recesses of the next adjacent row whereby the paths of successive recesses partially overlap, cylindrical cutter discs mounted in said recesses whereby the plane of said cutter discs lies parallel to the flat bottom face of said recesses, each disc having an end face providing a cutting edge disposed about the periphery of the end face and being rotatably indexable about its longitudinal axis to bring successive cutting portions into cutting position and said helical paths arranged such that at least one of said cutting discs is always under load and cutting stress at any time during the broaching operation.

11. A broaching tool according to claim 10 wherein the helical path defines an angle of about 15° to 45° with respect to the longitudinal axis of the tool body.

12. A broaching tool according to claim 11 wherein two or more adjacent rows of recesses are at the same diameter or elevation with respect to each other.

13. A broaching tool according to claim 11 wherein the last recess of at least one helical row of recesses is at the same diameter or elevation as the first recess of an adjacent helical row of recesses.

14. A broaching tool comprising an elongated tool body having an arcuate face of at least 45° and a front and rear end, a plurality of recess means adapted for holding cutter disc means formed in said arcuate face, each said recess means having at least one recess with a bottom face inclined inwardly and rearwardly within 1°–15° of coincidence with the longitudinal axis of the body and an arcuate abutment wall extending upwardly normal to a rearward portion of the bottom face, said recess means being arranged in a series of rows wherein said recess means within each row describe a circumferentially and axially advancing path about said tool body arcuate face, cutter disc means mounted in said recess means, each disc means having a circular end face formed to provide a cutting edge disposed about the periphery thereof whereby the plane of the one end face of said cutter disc means lies parallel to the bottom of the recess wherein mounted, each of said disc means being rotatably indexable about its longitudinal axis to bring successive cutting portions into cutting position, the cutter disc means and associated recess means being arranged so that at least two of said cutter disc means are intersected by all cutting planes normal to the longitudinal axis of the tool body between the first and last cutter disc means.

* * * * *

UNITED STATES PATENT AND TRADEMARK OFFICE
CERTIFICATE OF CORRECTION

PATENT NO. : 4,277,207
DATED : July 7, 1981
INVENTOR(S) : Sylvester E. Proulx

It is certified that error appears in the above-identified patent and that said Letters Patent are hereby corrected as shown below:

REFERENCES CITED

Re. 23,239   11/1974   Dupuis . . . . . . .   407/17
should read
    Re. 28,239   11/1974   Dupuis . . . . . . .   407/17

2,770,028   11/1956   Bonnaffe . . . . . .   407/15
should read
    2,770,028   11/1956   Bonnafe. . . . . . .   407/15

Column 1, line 30, "body of the axis" should read --axis of the body--.

Column 5, line 32, "broaching" should read --broach--

Column 5, line 47, U.S. Patent No. 3,936,472" should be --3,946,472--

Signed and Sealed this

Twenty-seventh Day of October 1981

[SEAL]

Attest:

GERALD J. MOSSINGHOFF

Attesting Officer    Commissioner of Patents and Trademarks

UNITED STATES PATENT AND TRADEMARK OFFICE
CERTIFICATE OF CORRECTION

PATENT NO. : 4,277,207
DATED : July 7, 1981
INVENTOR(S) : Sylvester E. Proulx

It is certified that error appears in the above—identified patent and that said Letters Patent is hereby corrected as shown below:

On The Title Page insert,

-- (30) Foreign Application Priority Data

October 5, 1977    Canada.......288,147    --.

Signed and Sealed this

Twentieth Day of July 1982

[SEAL]

Attest:

GERALD J. MOSSINGHOFF

Attesting Officer    Commissioner of Patents and Trademarks